Oct. 4, 1966    NOBUYASU YOKOI    3,276,742
VERTICAL SHAFT KAPLAN WATER TURBINES
Filed Nov. 5, 1963
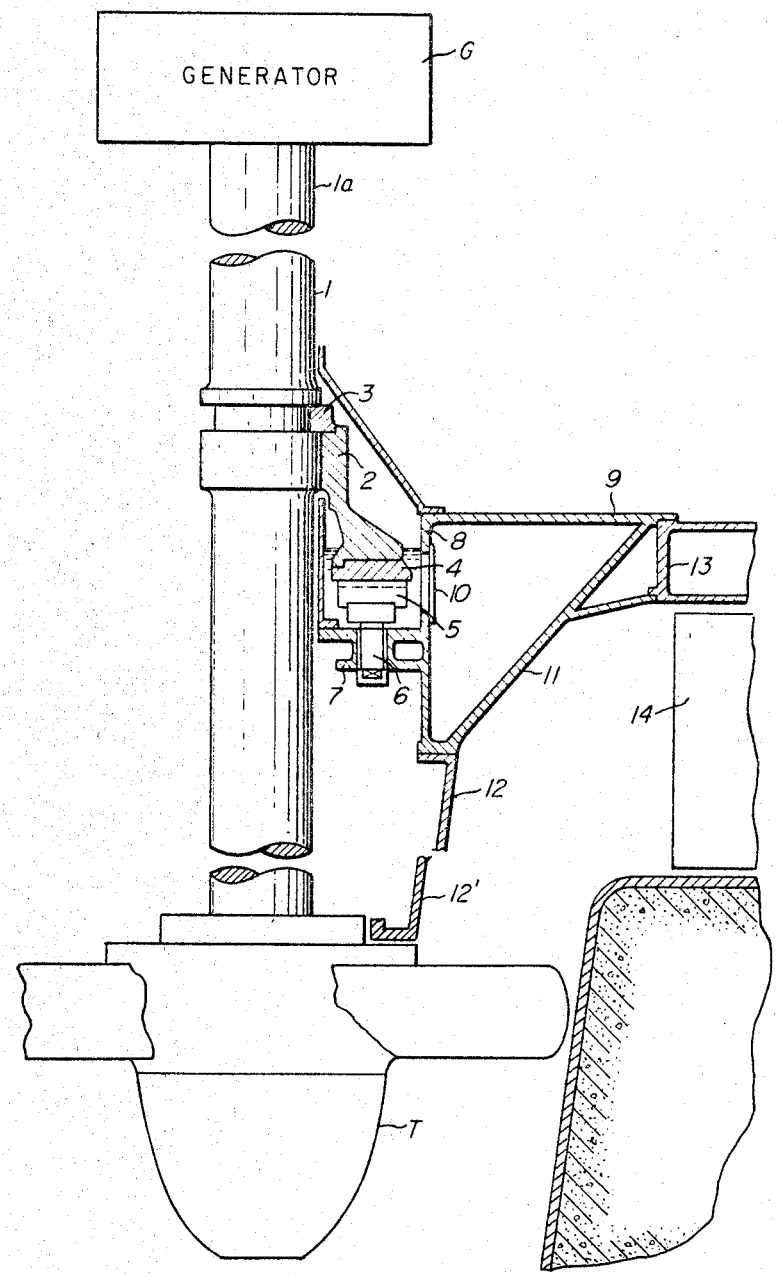
INVENTOR
NOBUYASU YOKOI
BY Paul M. Craig, Jr.
ATTORNEY 3,276,742
VERTICAL SHAFT KAPLAN WATER TURBINES
Nobuyasu Yokoi, Hitachi-shi, Japan, assignor to Hitachi, Ltd., Tokyo, Japan, a corporation of Japan
Filed Nov. 5, 1963, Ser. No. 321,526
2 Claims. (Cl. 253—117)

The present invention relates to a thrust bearing for a vertical shaft Kaplan water turbine with an electric generator coupled thereto, which thrust bearing is disposed below the upper cover plate of the head of the water turbine.

In a Kaplan water turbine of known construction, thrust bearings common to the water turbine and associated electric generator have generally been mounted on the upper end of the vertical shaft of the water turbine. Or more precisely, the turbine of conventional construction comprises a thrust supporting flange provided above the head face of the upper cover of the water turbine, and the thrust bearings are mounted in the vicinity of the electric generator of the turbine by means of the flange. However, such conventional construction provides an undesirable limitation against reduction of overall height of the coupled machinery. That is to say, in the conventional construction, the thrust bearings are placed above the head cover of the water turbine and the upper ends thereof protrude a considerable height above the head cover of the turbine. Therefore, the position of the upper guide bearings and the rotor of the generator mounted above said thrust bearings can not be lowered because they are restricted by the position of the thrust bearings. This is a hindrance to a compact construction of the machinery from an installational point of view.

Therefore, the primary object of the invention is to provide a vertical shaft Kaplan water turbine in which above defect of prior construction is effectively obviated.

Another object of the invention is to provide an improved thrust bearing which has a plurality of thrust pads each adjustable in relation to the abutting condition with the thrust collar.

According to the invention, there is provided a vertical shaft Kaplan water turbine comprising a turbine shaft, a thrust collar connected to said turbine shaft by means of a key for transmitting the thrust generated on said turbine shaft to a plurality of thrust pads, said thrust pads receiving said thrust through a thrust runner, and a thrust bearing casing integrally formed with an upper cover of said water turbine, which has a bottom plate and peripheral side walls, arrangement being such that the thrust bearing portion formed of said thrust runner and said thrust pads is disposed below the upper face of said upper cover of the water turbine.

There are other objects and particularities of the invention which will be obvious from the following description with reference to the accompanying drawing, in which the sole figure is a fragmentary axial sectional view of a preferred embodiment of a vertical shaft Kaplan water turbine according to the invention.

In the drawing, there is shown a main or turbine shaft 1 of a vertical shaft Kaplan water turbine runner T upon which the rotor shaft 1a of the generator G is coupled by means of a conventional coupling. A thrust collar 2 is firmly mounted on the main shaft 1 by means of a key 3 and has a thrust runner 4 fitted to the lower face thereof. A plurality of thrust pads 5 of segmental shape are adjustably disposed below said thrust runner 4 for receiving the thrust developed on the main shaft 1 and transmitted thereto through the thrust collar 2 and the thrust runner 4. The thrust pads 5 are supported on a bottom plate 7 of a thrust bearing casing by means of adjusting bolts 6, said bottom plate 7 being receded a substantial distance downwardly from the upper face of an upper cover 9 of the water turbine. Water intake guide plates, which generally form at least part of the head cover, comprise an inner part 13, and intermediate part—which includes the upper cover 9, a peripheral side wall 8, and an intake guide plate 11—and an outer part 12, 12'. Water from the intake casing flows through guide vanes 14 to the vanes of the turbine runner T through the passage formed by the intake guide plates. The intermediate part of the cover provides a high degree of structural strength since it is constructed integrally in such a manner that the upper cover 9, the peripheral side wall 8, and the water intake guide plate 11 are substantially triangular in cross section. The thrust bearing casing comprising said bottom plate 7 and peripheral side walls 8 of integral structure therewith is constructed in unitary relation with the immediate part of the head cover of the water turbine to increase the rigidity of the turbine structure. In a suitable portion of the outer peripheral side wall 8, an inspection opening 10 is provided with a cover 11 for the opening to give easy access to the interior of the bearing casing for inspection of the presence of oil 12 therein and like purposes.

From the foregoing description, it will be understood that, by the unique arrangement employed in the invention, the thrust bearings can be disposed at the position which is substantially inwardly of the upper cover of the water turbine, and the overall height of the machinery can thereby be reduced to a great extent. Further, unitary construction of the head cover of the water turbine and the thrust bearing cover, which have heretofore been separately mounted and fastened together by suitable means, will provide rigidity to both of the members without inflicting any increase in the total weight.

What is claimed is:
1. A vertical Kaplan water turbine coupled with a generator comprising:
 a turbine runner,
 a shaft interconnecting the runner with the rotor of said generator,
 a thrust collar and a thrust runner secured thereto,
 a key connecting said thrust collar to said shaft,
 a plurality of thrust pads supporting said thrust runner for receiving the thrust generated on said shaft,
 a head cover of said water turbine including water intake guide plates, an annular upper cover plate, and a peripheral side plate surrounding said shaft,
 a thrust bearing casing for containing oil including a bottom plate integral with said side plate,
 adjusting bolt means adjustably supporting each of said thrust pads on said bottom plate of said casing,
 said thrust runner and said thrust pads being disposed below the upper cover plate of said head cover.
2. A combination as defined in claim 1 wherein said peripheral side plate and said annular upper cover plate are formed integrally with a part of said water intake guide plates.

References Cited by the Examiner

UNITED STATES PATENTS

| | | | |
|---|---|---|---|
| 680,294 | 8/1901 | Trump | 253—117 X |
| 743,595 | 11/1903 | Trump | 253—117 X |
| 1,345,655 | 7/1920 | Wood. | |
| 2,733,892 | 2/1956 | Peyrin et al. | 253—148 |
| 2,808,227 | 10/1957 | Danel | 253—117 X |

FOREIGN PATENTS

| | | |
|---|---|---|
| 1,189,531 | 3/1959 | France. |
| 1,020,526 | 12/1957 | Germany. |
| 373,940 | 6/1932 | Great Britain. |
| 425,888 | 3/1935 | Great Britain. |

MARTIN P. SCHWADRON, *Primary Examiner.*

JULIUS E. WEST, SAMUEL LEVINE, *Examiners.*

E. A. POWELL, JR., *Assistant Examiner.*